United States Patent
Yaddanapudi et al.

(10) Patent No.: US 10,409,358 B1
(45) Date of Patent: Sep. 10, 2019

(54) MULTI-CHIP MODULE PACKAGE COMPACT THERMAL MODELS

(71) Applicant: Ansys, Inc., Canonsburg, PA (US)

(72) Inventors: Vamsi Krishna Yaddanapudi, Maharashatra (IN); Ankit R. Adhiya, Maharastra (IN); Aniket A. Kulkarni, Maharashtra (IN); Manoj Nagulapally, Austin, TX (US)

(73) Assignee: Ansys, Inc., Canonsburg, PA (US)

( * ) Notice: Subject to any disclaimer, the term of this patent is extended or adjusted under 35 U.S.C. 154(b) by 145 days.

(21) Appl. No.: 15/581,121

(22) Filed: Apr. 28, 2017

Related U.S. Application Data

(60) Provisional application No. 62/329,860, filed on Apr. 29, 2016.

(51) Int. Cl.
| | | |
|---|---|---|
| *G06F 1/20* | (2006.01) | |
| *G06F 9/50* | (2006.01) | |
| *G06F 11/30* | (2006.01) | |
| *G06F 17/50* | (2006.01) | |
| *G06F 1/3203* | (2019.01) | |
| *G06F 1/3287* | (2019.01) | |

(52) U.S. Cl.
CPC .......... *G06F 1/3287* (2013.01); *G06F 1/206* (2013.01); *G06F 17/5036* (2013.01); *G06F 1/3203* (2013.01); *G06F 9/5094* (2013.01); *G06F 11/3062* (2013.01); *G06F 17/5009* (2013.01)

(58) Field of Classification Search
CPC .............. G06F 1/3203; G06F 17/5036; G06F 17/5009; G06F 11/3062; G06F 9/5094; G06F 1/206; G06F 1/3287
USPC ...................... 713/323; 703/13, 14
See application file for complete search history.

(56) References Cited

U.S. PATENT DOCUMENTS

| | | | | |
|---|---|---|---|---|
| 5,675,521 A | * | 10/1997 | Holzhauer | .......... G06F 17/5018 706/45 |
| 2009/0048801 A1 | * | 2/2009 | Chandra | ............. G06F 17/5009 702/120 |
| 2010/0023903 A1 | * | 1/2010 | Pramono | ............. G06F 17/5036 716/106 |
| 2013/0298101 A1 | * | 11/2013 | Chandra | ................. G06F 17/50 716/136 |
| 2015/0019194 A1 | * | 1/2015 | Stella | .................. G06F 17/5036 703/14 |
| 2018/0075176 A1 | * | 3/2018 | Yasutake | ................. G06F 17/50 |

\* cited by examiner

*Primary Examiner* — Ji H Bae
(74) *Attorney, Agent, or Firm* — Jones Day

(57) ABSTRACT

The current subject matter provides for the generation of network models for multi-chip module packages that are a combination of compact models for each chip within such packages. In some variations, a combination of single chip extraction methods and a linear superposition technique can be used to predict junction temperatures of MCM packages. Related methods, systems, apparatus, and articles are also described.

24 Claims, 7 Drawing Sheets

MULTI-CHIP MODULE PACKAGE COMPACT THERMAL MODELS

CROSS-REFERENCE TO RELATED APPLICATIONS

This application claims priority to U.S. Provisional Application No. 62/329,860, filed Apr. 29, 2016, the entirety of which is herein incorporated by reference.

TECHNICAL FIELD

The subject matter described herein relates to the generation of compact models for multi-chip integrated circuit module packages.

BACKGROUND

Compact models are an important tool for use in the design of integrated circuits by simulating how such circuits may perform during use. In particular, compact models enable the reproduction of the thermal behavior of components within an integrated circuit package for use in a wide variety of system-level simulations. Such functionality is provided without having to provide detailed modeling of system level computational fluid dynamics.

One type of compact model is the DELPHI style compact model which has been proposed by the JEDEC Council for used in connection with single chip packages. Such compact network models are boundary condition independent and ensure that junction temperatures are predicted within 10% variance from predicted detailed package temperatures. With the recent trend of packing more and more functionality onto a single package, multi-chip module (MCM) IC packages (e.g., system-on-chips, etc.) having more than one functional block (chip) are becoming more prevalent. However, boundary condition-independent modeling techniques such as DELPHI have been conventionally limited to single chip IC packages.

SUMMARY

In one aspect, data is received that characterizes an integrated circuit (IC) package. Thereafter, functional chips in the IC package are identified with each such chip having an associated heat dissipation value. Subsequently, the identified chips in the IC package are individually and iteratively activated by selectively powering each chip and switching off all other chips. Based on the activating, a compact model is extracted for each identified chip in the IC package. The compact thermal model provides a thermal resistance network for the chip with each network including (i) a junction node which represents the corresponding chip, (ii) at least one internal node, and (iii) at least one face node representing connecting heat transfer connections from the junction to the outside environment of the IC package. The extracted compact thermal models are then combined to form a multi-chip compact thermal model that, in turn, provides a single thermal resistance network for each identified chip with the junction nodes and connections from each compact thermal model. Data comprising at least a portion of the multi-chip compact thermal model can then be provided (e.g., loaded into memory, displayed in an electronic visual display, persisted in a physical electronic storage medium, transmitted to a remote computing system, etc.).

In some variations, the compact thermal networks are extracted and constructed using the DELPHI methodology (as specified by JEDEC).

The combining can use linear time-invariant (LTI) system theory to combine the extracted compact models. The combining can additionally, or in the alternative, use linear superposition to combine the extracted compact models. The combining can use a series approach for calculating thermal resistance between two face nodes. The combining can use a parallel resistance approach for calculating thermal resistance between internal nodes and face nodes.

The provided data can be used in a variety of ways including to initiate a thermal simulation of the IC package using a heat transfer and fluid flow analysis software application.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a mechanism to characterize thermal interactions between different chips residing within the same package. In addition, by providing such a mechanism, the needs for analyzing numerous compact models which are each associated with only a single chip are obviated. Furthermore, providing a unified compact model characterizing a multi-chip module package also allows vendors to maintain the propriety of their packages while also providing sufficient information to OEMs on how such packages will thermally function.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter provides for the generation of thermal network models for MCM packages that are a combination of compact models for each chip within such packages. In some variations, a combination of the JEDEC proposed method and a linear superposition technique can be used to predict junction temperatures of MCM packages. The linear superposition method can take into account the interdependency of chips with each other, whereas the DELPHI method is based on a boundary condition-independent technique. To illustrate such innovations, an example is provided in diagram 100 of FIG. 1 that relates to a standard FPBGA peripheral type system-on-chip (SoC) package 110 with three chips 120, 130, 140.

Figure 1:
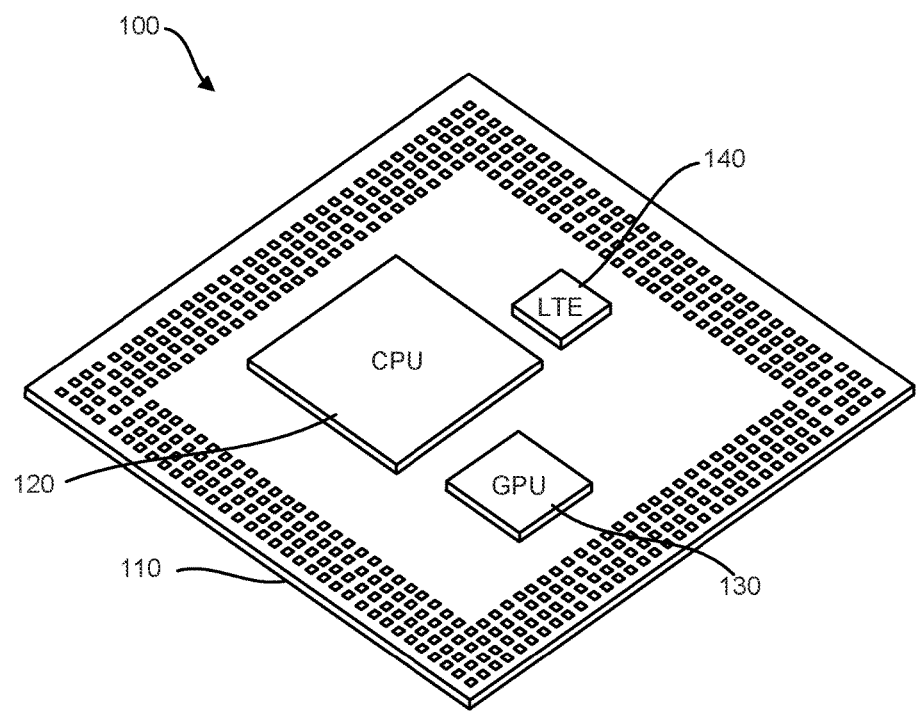
FIG. 1 is a diagram illustrating a multi-chip module package.

The package 110 of FIG. 1 can be of type peripheral array with a central array of thermal solder balls. The dimensions of the package 110 can, for example, be 18×18 mm in length and width and 1.4 mm in height. A CPU chip 120 is the largest chip, followed by a GPU chip 130 and an LTE chip 140 for communications. Similar packages are used in a variety of mobile communications devices such as smart phones and tablets.

Location of chips within an MCM package are typically chosen to account for proximity effects, if any in the temperature calculations. It can be seen from FIG. 1, that the chips are very close, so it is important, during design time, to accurately characterize junction temperatures due to proximity of the other chips. Continuing with this example, a DELPHI compact model can be generated for the three chip FPBGA package 110 using a combination technique such as linear superposition. Various types of simulation applications can be used for extracting the compact model, including, for example, the ANSYS ICEPAK application/platform. As will be described in further detail below, such a technique can be used in combination with JEDEC boundary condition-independent methods to extract the network by including all details of the package including solder balls.

Figure 2:
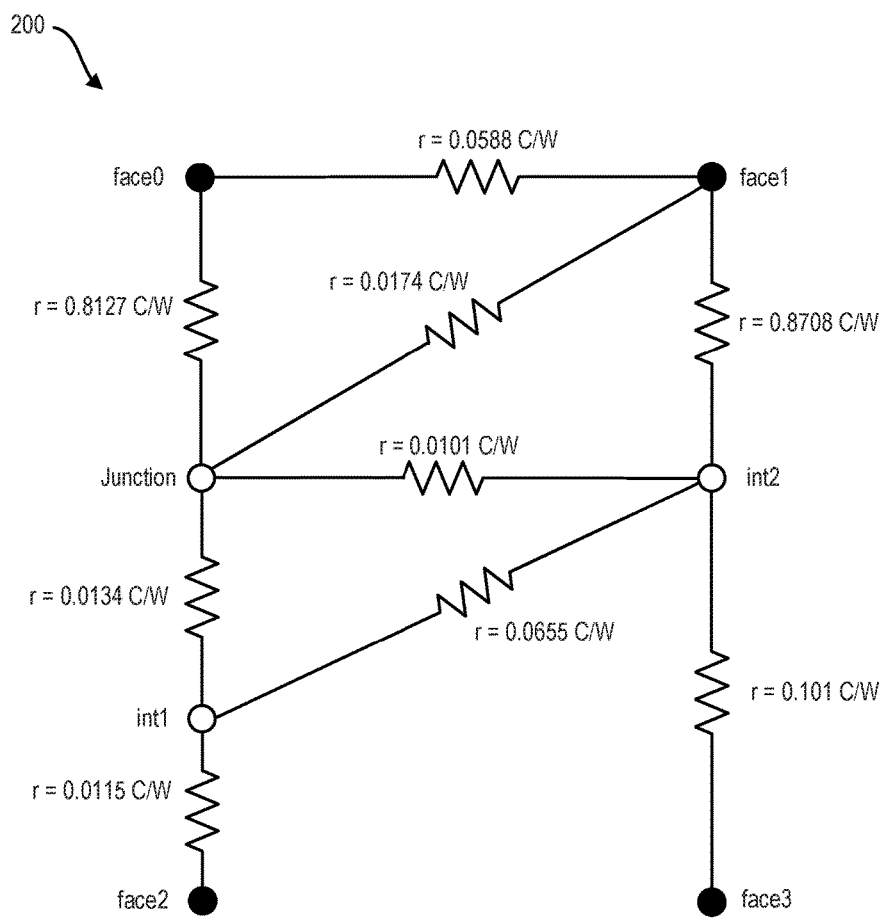
FIG. 2 is a diagram illustrating a compact model for a single chip.

For illustration purposes, diagram 200 of FIG. 2 illustrates a compact model for a single chip according to the JEDEC DELPHI standard. This diagram illustrates the thermal resistance from a junction to two interior nodes. In addition, the thermal resistance values are also illustrated in connection with outer faces (face0, face1, face2, face3) of a corresponding integrated circuit package.

Going back to the example of the MCM package 110, for each chip/die 120, 130, 140, an extraction process can be performed by using, for example, a 58 boundary condition set according to the DELPHI standard. In order to account for the heat transfer through the sides of the package 110, all four sides of the detailed package 110 can also be included in the extraction process for the CPU 120 (such as illustrated in FIG. 2). The other chips 130 and 140 are made inactive while the extraction for CPU 120 is carried out. This process can be repeated for the other two chips 130, 140 by activating one chip at a time. Once the network topology is extracted for all three chips 120, 130, 140, a linear superposition technique can be applied to combine all three networks as illustrated in diagram 300 of FIG. 3 (which, for illustration purposes, is not to scale relative to FIG. 2). Once all three networks are combined, the resulting network can have five internal nodes and nine face/boundary nodes. The sample topology of the combined network is similar to the one which is proposed by JEDEC for a single die package except that there are additional nodes and links for the multiple die packages.

Figure 3:
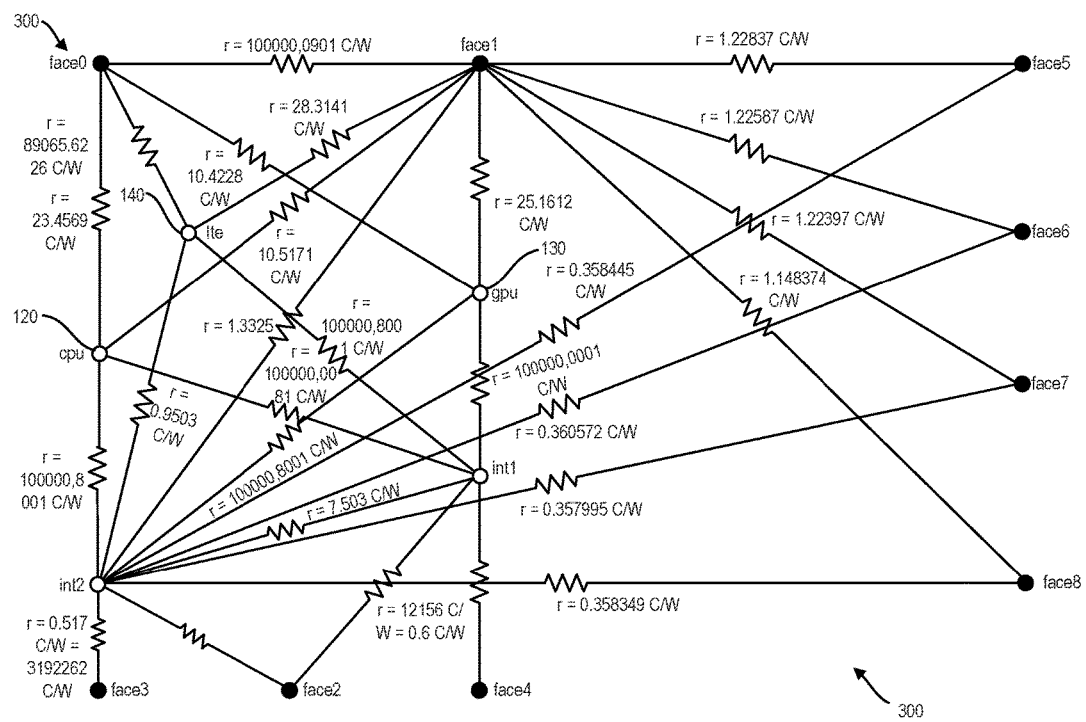
FIG. 3 is a diagram illustrating a compact model for multiple chips within the multi-chip module package of FIG. 1.
Figure 4:
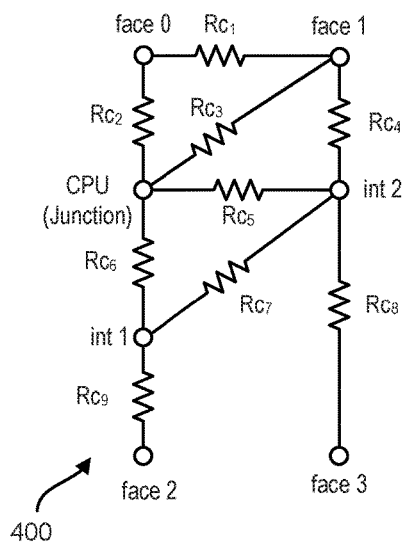
FIG. 4 is a diagram illustrating a compact model for a CPU.
Figure 5:
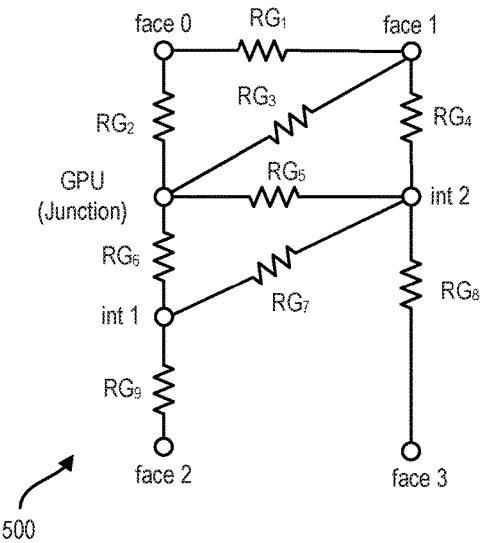
FIG. 5 is a diagram illustrating a compact model for a GPU.

The extended topology of FIG. 3 comprises five internal nodes, out of which three junction nodes represent CPU 130, GPU 140, and LTE 150 chips. The two additional internal nodes follow similar patterns with JEDEC network which is shown in FIG. 3 and represent the region between the chips and bottom part of the package. The extended network can comprise nine faces: two faces on top, three faces on the bottom side representing the inner thermal balls region, suppressed region and the outer region of the package, and four faces to represent the sides of the package.

In order to compare detailed and DELPHI network models, maximum chip temperatures from detailed package simulations were compared with the DELPHI network junction temperatures. To facilitate easier comparison, error estimate calculations are chosen by JEDEC as provided below:

$$\text{Error} = (T_{Delphi} - T_{Detailed}) / (T_{Detailed} - T_{Ambient}) \quad (1)$$

Error is multiplied by 100 for % conversion and $T_{Ambient}$ was chosen as 20° C. in the current example.

Diagrams 400-700 of FIGS. 4-7 are provided to further illustrate linear superpositions. In one general example, the superposition can be started with a network obtained from an extraction of a first chip (diagram 400 which pertains to a CPU) that is to be combined with a second chip (diagram 500 of FIG. 5). There are two categories of links (resistances) in general. A first category (category 1) consists of resistances that are connected to chip nodes. There are four of these links—connecting (a.) junction-face0 (b.) junction-int1 (c.) junction-face1 (d.) junction-int2. A second category (category 2) of resistances includes all resistances other than those falling within the first category.

Figure 6:
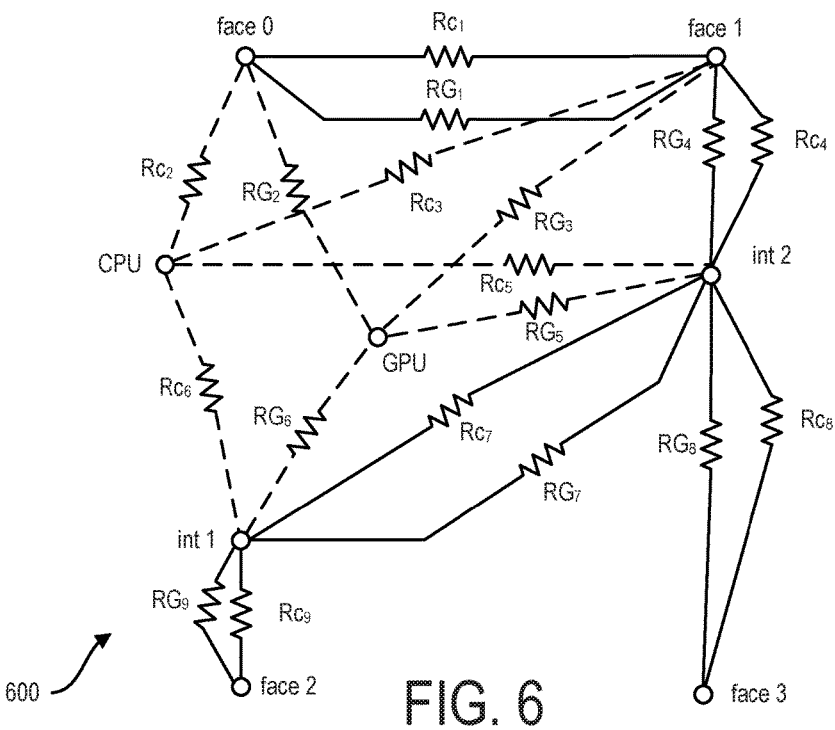
FIG. 6 is a first diagram illustrating a compact model for both of the CPU of FIG. 4 and the GPU of FIG. 5.

With reference to diagram 600 of FIG. 6, for creating a final combined network, the four category 1 resistances from the two separately extracted networks as they are connecting face0, face1, int1 and int2. In FIG. 6, the suffixes C and G respectively refer to the resistances in the compact models for the CPU and the GPU. This diagram is included to show the effective resistances across the nodes using the two compact models of FIGS. 4 and 5. As noted, the category 2 resistances include effective resistances from the two chips and, as such, the equivalent resistance can be calculated as follows:

$$\frac{1}{R_{equivalent}} = \frac{1}{R_1} + \frac{1}{R_2} \ldots$$

Figure 7:
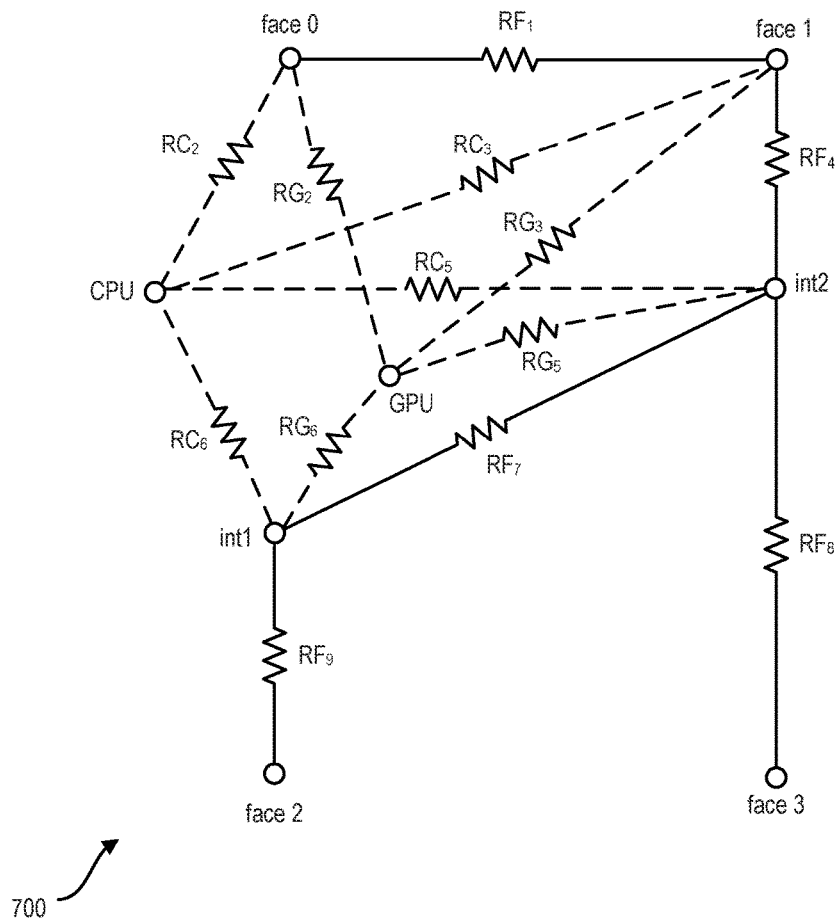
FIG. 7 is a second diagram illustrating a compact model for both of the CPU of FIG. 4 and the GPU of FIG. 5.

Each of the individual resistances (in this case there are two but it will be appreciated that the above expression is able to be used with multiple chips beyond two) are then used to determine the equivalent resistances. The diagram 700 of FIG. 7 illustrates the equivalent resistances across the various nodes with the suffix F referring to such equivalent resistance after combining the network models.

Figure 8:
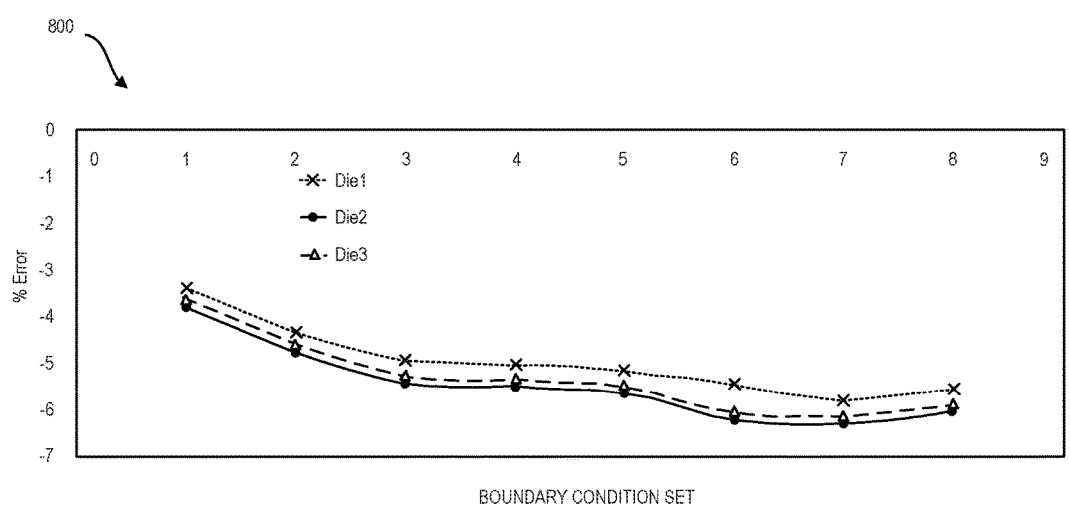
FIG. 8 is a diagram illustrating a temperature comparison among three dies for a natural convection setup.

FIG. 8 is a diagram 600 illustrating a comparison of temperatures for all three chips 120, 130, 140 (referred to sometimes as dies) over predefined boundary conditions. It was observed that in the DELPHI style compact thermal model, temperatures are over-predicted in some cases and under-predicted in other cases. In all cases, it was noticed that the temperatures exhibit consistent patterns for all three chips/dies 120, 130, 140.

Condition 8 in FIG. 8 represents a Reynolds number of 40,000 which is an extreme boundary condition. It is noted that, when compared to a simulation of the detailed IC package, the combined compact model is still within 10% error. From the results, it can be observed that the temperature comparison is within the permissible limit for most of the cases for all three dies. Also, it can be seen that the comparison trend for all three dies is consistent across different boundary conditions.

Figure 9:
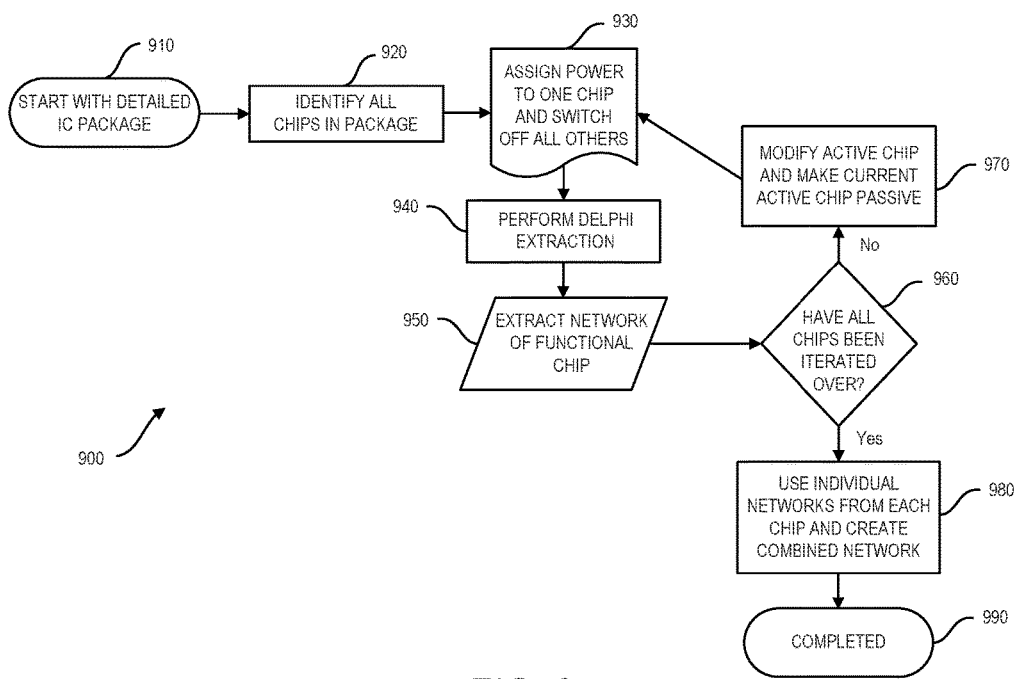
FIG. 9 is a process flow diagram illustrating the generation of a compact model for a multi-chip module package.

FIG. 9 is a process flow diagram 900 illustrating generation of a compact model for a multi-chip module package. Initially, at 910, data is received that characterizes the detailed IC package. The data can be received from a CAD system for IC package design. The data can include the outlines and positions of the dies, detailed geometry for metal layers, vias, solder balls and solder bumps, layer thicknesses, materials and the locations and values of discrete passive components as well as data characterizing the chips within the IC package. The die can be explicitly identified in such CAD data.

Thereafter, at 920, all functional chips in the IC package can be identified. Example identification techniques include, but are not limited, to metadata and tags within the data. Each chip will have an associated heat dissipation value. In some variations, this heat dissipation value can be specified in the received data. Next, at 930, an iterative process begins by looping over all chips and making one chip active at time and powering down/deactivating all other chips. This looping can be effected by, for example, assigning a constant heat to the then current active chip and removing the heat dissipation from all other chips. This, in turn, can be accomplished within the thermal/CFD solver by assigning volumetric heat dissipation sources within the spatial regions occupied by each die. In the case of an inactive die, the heat dissipation can be set to zero.

Then, for each chip, an extraction procedure can be performed (e.g., DELPHI extraction procedure, etc.) at 940 so that, at 950, the network (e.g., DELPHI compact network, etc.) of the corresponding functional chip can be extracted. Such extraction can include self and mutual heat transfer characteristics of the active chip. At 550, when the network is extracted, the heat transfer characteristic of the active chip is taken into account; not only through the boundary nodes but also to the other chips that are currently off. Hence, when superposition is performed we get to see a gradient of temperature within the chips themselves.

Here, an inner iterative loop can be carried out here over different thermal boundary condition cases as specified by the JEDEC standard. Each case can then be analyzed with a 3D thermal/CFD solver such as ICEPAK. The resulting compact network for each chip will be similar to that illustrated in FIGS. 2 and 3.

It is then determined, at 960, whether each chip has been iterated over. If not, then at 970, a new active chip is made active (i.e., a chip that was not previously made active), and the previously activated chip is made passive and the process repeats until such time that all chips are made active and the compact model is extracted for all identified functional chips.

At this point, there are multiple compact networks that correspond to each chip in the IC package. Subsequently, at 580, the individual networks can be combined to create a single unified network. This combination can be effected, for example, using superposition and/or linear time invariant techniques.

While combining, all the connections or links from the junction to other functional parts is copied to the combined network. As a result, the final compact model will have multiple chips and associated connections from the junctions of each chip/die in the IC package. In addition to the connections from junction, the combined compact model also includes connections between other face nodes and internal nodes. For each chip extraction, there can be different values of resistances for each of these nodes. For connections/resistances which are not related to a junction, series and parallel resistance approaches can combine the network resistance values in the final network.

In addition, in the combined compact model, there can be network connections between face nodes. Heat transfer fundamentals can be utilized such as, for example, between face0 and face 1, heat transfer path is serial, thus, the connections between these faces can be combined based on the series approach. Similarly between internal nodes and face nodes, heat transfer path is parallel, so a resistance calculation procedure can be used that assumes the heat transfer path is in parallel.

Once completed, the combined compact model (such as that illustrated in FIG. 3.) will have multiple junctions to represent multiple chips. This network will also contain new heat transfer paths for the combined compact model. The resulting compact thermal model can be used in a variety of ways including within a thermal/CFD simulation of a larger system, for example a printed circuit board with several multi-chip packages mounted on it.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
receiving data characterizing an integrated circuit (IC) package;
identifying functional chips in the IC package;
individually activating each identified functional chip in the IC package by selectively powering each identified functional chip and switching off all other chips;
extracting, based on the activating, a thermal resistance network for each identified functional chip, each network comprising a junction node representing a corresponding chip and a face node representing a heat transfer connection from the junction node to an outside environment of the IC package;
combining the extracted thermal resistance networks to provide a single thermal resistance network with junction nodes and face nodes of the identified functional chips; and
providing data comprising at least a portion of the single thermal resistance network.

2. The method of claim 1, wherein the providing data comprises at least one of: displaying at least a portion of the provided data in an electronic visual display, storing at least a portion of the provided data in a physical electronic storage medium, loading at least a portion of the provided data into memory, or transmitting at least a portion of the provided data to a remote computing system.

3. The method of claim 1, wherein the thermal resistance networks are extracted and constructed using the DELPHI methodology.

4. The method of claim 1, wherein the combining uses linear time-invariant (LTI) system theory to combine the extracted thermal resistance networks.

5. The method of claim 1, wherein the combining uses linear superposition to combine the extracted thermal resistance networks.

6. The method of claim 1, wherein the combining uses a series approach for calculating thermal resistance between two face nodes.

7. The method of claim 1, wherein the combining uses a parallel resistance approach for calculating thermal resistance between internal nodes and face nodes.

8. The method of claim 1 further comprising:
initiating, using the provided data, a thermal simulation of the IC package using a heat transfer and fluid flow analysis software application.

9. A system comprising:
at least one data processor; and
memory storing instructions which, when executed by the at least one data processor, result in operations comprising:
receiving data characterizing an integrated circuit (IC) package;
identifying functional chips in the IC package;
individually activating each identified functional chip in the IC package by selectively powering each identified functional chip and switching off all other identified functional chips;
extracting, based on the activating, a thermal resistance network for each identified functional chip, each network comprising a junction node representing a corresponding chip and a face node representing a heat transfer connection from the junction node to the outside environment of the IC package;
combining extracted thermal resistance networks to provide a single thermal resistance network with junction nodes and face nodes of the identified functional chips; and
providing data comprising at least a portion of the single thermal resistance network.

10. The system of claim 9, wherein the providing data comprises at least one of: displaying at least a portion of the provided data in an electronic visual display, storing at least a portion of the provided data in a physical electronic storage medium, loading at least a portion of the provided data into memory, or transmitting at least a portion of the provided data to a remote computing system.

11. The system of claim 9, wherein the thermal resistance networks are extracted and constructed using the DELPHI methodology.

12. The system of claim 9, wherein the combining uses linear time-invariant (LTI) system theory to combine the extracted thermal resistance networks.

13. The system of claim 9, wherein the combining uses linear superposition to combine the compact thermal resistance networks.

14. The system of claim 9, wherein the combining uses a series approach for calculating thermal resistance between two face nodes.

15. The system of claim 9, wherein the combining uses a parallel resistance approach for calculating thermal resistance between internal nodes and face nodes.

16. The system of claim 9, wherein the operations further comprise:

initiating, using the provided data, a thermal simulation of the IC package using a heat transfer and fluid flow analysis software application.

17. A non-transitory computer program product storing instructions, which when executed by at least one data processor forming part of at least one computing device, result in operations comprising:

receiving data characterizing an integrated circuit (IC) package;

identifying functional chips in the IC package;

individually activating each identified functional chip in the IC package by selectively powering each identified functional chip and switching off all other identified functional chips;

extracting, based on the activating, a thermal resistance network for each identified functional chip, each network comprising a junction node representing a corresponding chip and a face node representing a heat transfer connection from the junction node to the outside environment of the IC package;

combining extracted thermal resistance networks to provide a single thermal resistance network with junction nodes and face nodes of the identified functional chips; and providing data comprising at least a portion of the single thermal resistance network.

18. The computer program product of claim 17, wherein the providing data comprises at least one of: displaying at least a portion of the provided data in an electronic visual display, storing at least a portion of the provided data in a physical electronic storage medium, loading at least a portion of the provided data into memory, or transmitting at least a portion of the provided data to a remote computing system.

19. The computer program product of claim 17, wherein the thermal resistance networks are extracted and constructed using the DELPHI methodology.

20. The computer program product of claim 17, wherein the combining uses linear time-invariant (LTI) system theory to combine the extracted thermal resistance networks.

21. The computer program product of claim 17, wherein the combining uses linear superposition to combine the extracted thermal resistance networks.

22. The computer program product of claim 17, wherein the combining uses a series approach for calculating thermal resistance between two face nodes.

23. The computer program product of claim 17, wherein the combining uses a parallel resistance approach for calculating thermal resistance between internal nodes and face nodes.

24. The computer program product of claim 17, wherein the operations further comprise:

initiating, using the provided data, a thermal simulation of the IC package using a heat transfer and fluid flow analysis software application.

* * * * *